US010340515B2

(12) United States Patent
De Vries et al.

(10) Patent No.: US 10,340,515 B2
(45) Date of Patent: Jul. 2, 2019

(54) CARBON-COATED LITHIUM SULPHIDE (71) Applicants: Rockwood Lithium GmbH, Frankfurt (DE); Volkswagen AG, Wolfsburg (DE)

(72) Inventors: Henrik De Vries, Muenster (DE); Sangsik Jeong, Ulm (DE); Stefano Passerini, Muenster (DE)

(73) Assignees: ROCKWOOD LITHIUM GMBH, Frankfurt (DE); VOLKSWAGEN AG, Wolfsburg (DE)

( * ) Notice: Subject to any disclaimer, the term of this patent is extended or adjusted under 35 U.S.C. 154(b) by 463 days.

(21) Appl. No.: 15/031,040

(22) PCT Filed: Oct. 27, 2014

(86) PCT No.: PCT/EP2014/072949
§ 371 (c)(1),
(2) Date: Apr. 21, 2016

(87) PCT Pub. No.: WO2015/063007
PCT Pub. Date: May 7, 2015

(65) Prior Publication Data
US 2016/0268597 A1 Sep. 15, 2016

(30) Foreign Application Priority Data
Oct. 28, 2013 (DE) .......................... 10 2013 111 853

(51) Int. Cl.
*H01M 4/136* (2010.01)
*H01M 4/36* (2006.01)
*C01B 17/22* (2006.01)
*H01M 4/04* (2006.01)
*H01M 4/1393* (2010.01)
(Continued)

(52) U.S. Cl.
CPC ............. *H01M 4/366* (2013.01); *C01B 17/22* (2013.01); *C23C 18/1204* (2013.01); *C23C 18/1229* (2013.01); *H01B 1/10* (2013.01); *H01M 4/0471* (2013.01); *H01M 4/136* (2013.01); *H01M 4/1393* (2013.01); *H01M 4/1397* (2013.01); *H01M 4/5815* (2013.01); *H01M 4/625* (2013.01); *H01M 10/052* (2013.01); *H01M 10/0525* (2013.01); *H01M 2004/028* (2013.01);
(Continued)

(58) Field of Classification Search
CPC .................................................... H01M 4/366
See application file for complete search history.

(56) References Cited

U.S. PATENT DOCUMENTS 9,337,476 B2 5/2016 Takeuchi et al.
2011/0171537 A1 7/2011 Takeuchi et al.
(Continued)

FOREIGN PATENT DOCUMENTS

WO 2012084878 A1 6/2012
WO 2013057023 A1 4/2013

OTHER PUBLICATIONS

Liang Zhao et al: "Porous Li4Ti5O12 Coated with N-Doped Carbon from Ionic Liquids for Li-Ion Batteries", Advanced Materials, vol. 23. No. 11, Mar. 18, 2011, pp. 1385-1388.
(Continued)

*Primary Examiner* — James Lee
(74) *Attorney, Agent, or Firm* — Abel Schillinger, LLP (57) ABSTRACT Process for producing an active material for batteries from lithium sulfide and ionic liquids, corresponding active materials, cathode materials, batteries and corresponding uses.

20 Claims, 9 Drawing Sheets (51) Int. Cl.
*H01M 4/1397* (2010.01)
*H01M 4/58* (2010.01)
*H01M 10/052* (2010.01)
*H01B 1/10* (2006.01)
*C23C 18/12* (2006.01)
*H01M 4/62* (2006.01)
*H01M 10/0525* (2010.01)
*H01M 4/02* (2006.01)

(52) U.S. Cl.
CPC ........ *H01M 2220/20* (2013.01); *Y02E 60/122* (2013.01)

(56) References Cited

U.S. PATENT DOCUMENTS

| | | |
|---|---|---|
| 2013/0327249 A1 | 12/2013 | Winter et al. |
| 2014/0255787 A1 | 9/2014 | Passerini et al. |

OTHER PUBLICATIONS

Jens Peter Paraknowitsch et al: "Functional Carbon Materials From Ionic Liquid Precursors", Macromolecular Chemistry and Physics, vol. 213, No. 10-11, Jun. 14, 2012, pp. 1022-1145.

Li₂S: EMIM TCM (5:1), diluted in acetonitrile

CARBON-COATED LITHIUM SULPHIDE

All documents cited in the present patent application are incorporated by reference in their entirety in the present disclosure.

BACKGROUND OF THE INVENTION

1. Field of the Invention

The present invention relates to an active material for batteries based on carbon-coated lithium sulfide.

2. Discussion of Background Information

Uses for batteries, for example in electric vehicles, or else storage technologies for renewable energies (e.g. wind energy, solar energy, etc.) require the development of new technologies for rechargeable batteries having significantly higher specific energies than have hitherto been available or been able to be procured commercially.

The lithium-sulfur battery is a very promising technology for these fields of application.

Accordingly, attempts have been made in the prior art to provide active materials based on lithium sulfide. Enveloping lithium sulfide with a carbon layer, with the carbon layer being produced from polyacrylonitrile or sucrose, is known from WO 2013/057023.

Furthermore, lithium-based systems which are based not on lithium sulfide but on other lithium compounds have been studied in the prior art. Thus, for example, L. Zhao et al., Adv. Mater. 2011, 23, 1385-1388, discloses enveloping especially $Li_4Ti_5O_{12}$ with a carbon layer, with the latter being produced from ionic liquids. The advantageous properties of the shell are ascribed to, inter alia, interphase formation with Ti.

Paraknowitsch et al., Macromol. Chem. Phys. 2012, 213, 1132-1145, also describe various carbon materials obtained from ionic liquids.

It is an object of the present invention to provide active materials for batteries which have improved properties compared to the systems known from the prior art.

Accordingly, it is an object to find, inter glia, an inexpensive, effective and reliable process for producing active materials for batteries, in particular taking into account a future possible industrial use of the process.

Furthermore, it was an object to provide advantageous active materials for batteries, corresponding electrodes and batteries themselves.

In addition, it was an object of the present invention to find corresponding uses for the active materials of the invention.

A further object of the present invention was to provide a cathode material using the active materials of the invention.

SUMMARY OF THE INVENTION

The present invention provides a process for producing an active material for batteries. The process comprises steps a) to e) below or consists of these steps:
 a) provision of lithium sulfide,
 b) optionally drying and/or comminution of the lithium sulfide,
 c) addition of at least one ionic liquid, optionally in a suitable organic solvent, and mixing,
 d) heating of the mixture, optionally under protective gas, to a temperature above the decomposition limit of the ionic liquid and below the decomposition temperature of the lithium sulfide particles, as a result of which the at least one ionic liquid decomposes to carbon and the latter deposits as homogeneous layer on the surface of the $Li_2S$ particles,
 e) optionally comminution of the resulting product to break up agglomerates.

In one aspect of the process, the lithium sulfide may be $Li_2S$.

In another aspect of the process, in step b) drying may be carried out at temperatures of from 50 to 150° C. for from 5 hours to 2 days and/or the comminution of the lithium sulfide particles may be carried out by milling, in particular by means of a ball mill and/or by manual milling.

In yet another aspect of the process, the at least one ionic liquid may have a nitrogen-containing cation, preferably selected from pyridinium, pyridinium derivatives, pyrrolidinium, pyrrolidinium derivatives, imidazolium, imidazolium derivatives and mixtures thereof, particularly preferably selected from 1-butyl-3-methylimidazolium, 1-ethyl-3-methylimidazolium and 1-butyl-1-methylpyrrolidinium, as cation and may have an anion selected from dicyanamide, tricyanomethanide and mixtures thereof, preferably tricyanomethanide, as anion.

In a still further aspect of the process, the at least one ionic liquid may be selected from 1-butyl-3-methylimidazolium dicyanamide, 1-ethyl-3-methylimidazolium tricyanomethanide, 1-butyl-1-methylpyrrolidinium tricyanomethanide and mixtures thereof.

In another aspect, acetonitrile and/or N-methylpyrrolidone, preferably acetonitrile, may be used as solvent.

In another aspect, in step d) heating may be carried out to up to 850° C., preferably from 550 to 750° C., and this temperature may be maintained for from 2 to 5 hours, preferably 3 hours.

In another aspect, in step d) heating may firstly be carried out to from 250 to 350° C. and this temperature may then be maintained for from 0.5 to 3 hours and heating may then be carried out to up to 850° C., preferably from 550 to 750° C., and this temperature may be maintained for from 2 to 5 hours, preferably 3 hours.

The present invention also provides electrodes and/or batteries which use an active material produced by the process of the invention, in particular as cathode material in lithium metal batteries and/or lithium ion batteries.

The present invention also provides a process for producing a cathode material. The process comprises the steps
 i) provision of an active material produced by the process of the invention as set forth above, including the various aspects thereof,
 ii) addition of at least one electronically conductive additive, optionally with addition of at least one suitable binder,
 iia) optionally addition of further additives,
 iii) mixing of the materials,
 iv) processing of the resulting mixture, preferably by drawing and/or casting,
 v) drying of the material obtained,
 where a solvent, particularly preferably NMP, is preferably used in steps i) to iv).

In one aspect, the process may consist of steps i) to v).

The present invention also provides an active material for batteries which has been produced by the process of the invention as set forth above (including the various aspects thereof).

The present invention also provides an active material for batteries containing electrochemically active lithium sulfide particles which are coated with or enveloped in a homogeneous carbon shell. The carbon shell is produced by thermal decomposition of at least one ionic liquid.

In one aspect of the active material, the lithium sulfide may be $Li_2S$ and the at least one ionic liquid may be selected from 1-butyl-3-methylimidazolium dicyanamide, 1-ethyl-3-methylimidazolium tricyanomethanide, 1-butyl-1-methylpyrrolidinium tricyanomethanide and mixtures thereof.

Definition of Terms

For the purposes of the present invention, all amounts indicated are, unless indicated otherwise, by weight.

For the purposes of the present invention, the term "room temperature" means a temperature of 20° C. Temperatures indicated are, unless indicated otherwise, in degrees Celsius (° C.).

Unless indicated otherwise, the reactions or process steps mentioned are carried out at atmospheric pressure, i.e. at 1013 mbar.

Unless indicated otherwise, sizes in the nanometer range or micron range were/are determined by means of scanning electron microscopy (SEM), or are to be determined in this way.

For the purposes of the present invention, the term "ionic liquid" refers to liquids consisting exclusively of cations and anions. These have low melting points below 100° C. The ionic liquids have virtually no vapor pressure at room temperature. The size and symmetry of the participating ions hinders the formation of a strong crystal lattice. Even a small quantity of thermal energy is therefore sufficient to overcome the lattice energy and break up the solid crystal structure. In particular, ionic liquids are, for the purposes of the present invention, materials which are liquid at temperatures in the range from −10 to 80° C., in particular at room temperature. For the purposes of the present invention, ionic liquids are also abbreviated as IL.

For the purposes of the present invention, the formulation "and/or" includes any and also all combinations of the elements mentioned in the respective list.

Detailed Description

The present invention provides, in particular, a process for producing an active material for batteries, which comprises the steps a) to e) below or consists of these steps:
a) provision of lithium sulfide, preferably $Li_2S$,
b) optionally drying and/or comminution of the lithium sulfide, in particular to sizes below 2 µm, in particular below 1 µm,
c) addition of at least one ionic liquid, optionally in a suitable organic solvent, and mixing,
d) heating of the mixture under protective gas to a temperature above the decomposition limit of the ionic liquid and below the decomposition temperature of the $Li_2S$ particles, as a result of which the at least one ionic liquid decomposes to carbon and the latter deposits as homogeneous layer on the surface of the $Li_2S$ particles,
e) optionally comminution of the resulting product to break up agglomerates.

As lithium sulfide, it is possible to use, for the purposes of the present invention, both $Li_2S_x$, where x=2-8, and $Li_2S$, with preference being given to $Li_2S$. It is advantageous here for the average particle size of the lithium sulfide to be below 2 µm, in particular below 1 µm, in order to achieve a high specific surface area.

If the lithium sulfide used already has an average particle size below 2 µm, in particular below 1 µm, milling is not necessary (but nevertheless possible).

The drying of the lithium sulfide is usually carried out at temperatures of from 50 to 150° C. for from 5 hours to 2 days and the comminution of the lithium sulfide particles is carried out by milling, in particular by means of a ball mill and/or by manual milling. The milling is preferably carried out in acetonitrile in order to prevent abrasion of the balls in the ball mill.

The ionic liquid to be added has to be selected so that it decomposes into carbon when being heated under protective gas at a temperature below the melting point of the lithium sulfide. ILs which firstly polymerize during this operation are particularly useful since the coating is made more stable and homogeneous thereby.

It is advantageous for the ILs used to form nitrogen-containing graphitic carbon coatings.

The ILs which can be used for the purposes of the present invention preferably have cations which contain nitrogen and are in particular selected from the group consisting of pyridinium, pyridinium derivatives, pyrrolidinium, pyrrolidinium derivatives, imidazolium, imidazolium derivatives and/or mixtures thereof. In this context, derivatives are parent compounds substituted by hydrocarbon radicals. Here, for example, 1 or 2 alkyl chains, preferably made up of $C_1$-$C_{12}$-alkanes, can be present on the nitrogen atoms of the parent compounds, with the alkyl chains being able to contain heteroatoms, in particular oxygen; when pure alkyl chains are present, particular preference is given to these having a chain length of from 1 to 6 carbon atoms. Such derivatives are known to those skilled in the art.

Examples are:
1-butyl-3-methylimidazolium (BMIM),
1-ethyl-3-methylimidazolium (EMIM),
1-butyl-1-methylpyrrolidinium ($Pyr_{14}$),
3-methyl-N-butylpyridinium (3MBP),
1-decyl-3-methylimidazolium (DMIM),
1-hexyl-3-methylimidazolium (HMIM),
1-cyanomethyl-3-methylimidazolium (MCNIM),
1,3-bis(cyanomethyl)imidazolium (BCNIM),
N-(2-methoxyethyl)-N-methylpyrrolidinium ($Pyr_{12}O_1$).

The ILs which can be used for the purposes of the present invention preferably have anions which contain cyano function(s), in particular selected from the group consisting of dicyanamide, tricyanomethanide, derivatives thereof and/or mixtures thereof. In this context, derivatives are parent compounds substituted by hydrocarbon radicals.

ILs which are preferred for the purposes of the present invention are those selected from the group consisting of:
1-butyl-3-methylimidazolium dicyanamide (BMIM DCA),
1-ethyl-3-methylimidazolium tricyanomethanide (EMIM TCM),
1-butyl-1-methylpyrrolidinium tricyanomethanide ($Pyr_{14}$TCM),
3-methyl-N-butylpyridinium dicyanamide (3MBP DCA),
1-ethyl-3-methylimidazolium dicyanamide (EMIM DCA).

According to the invention, particular preference is given to using 1-butyl-3-methylimidazolium, 1-ethyl-3-methylimidazolium and/or 1-butyl-1-methylpyrrolidinium as cations.

ILs which can particularly preferably be used for the purposes of the present invention are those selected from the group consisting of 1-butyl-3-methylimidazolium dicyanamide, 1-ethyl-3-methylimidazolium tricyanomethanide, 1-butyl-1-methylpyrrolidinium tricyanomethanide and mixtures thereof, most preferably EMIM TCM and/or $Pyr_{14}$ TCM.

It is equally well possible for the purposes of the present invention to make concomitant use of minor amounts, i.e. less than 20%, preferably less than 10%, in particular less than 5%, most preferably less than 1%, of ILs which do not have the abovementioned cations and/or anions. Examples which may be mentioned are: bistrifluoromethylsulfonylimide ($Tf_2N$) or bis(perfluoroethylsulfonyl)imide (BETI) and, less preferably, halide anions ($Cl^-$, $Br^-$, $F^-$, in particular $Cl^-$). Preference is given to not using these.

The IL can optionally be added in a customary organic solvent. The organic solvents should preferably evaporate easily and have a low viscosity.

As organic solvents for this purpose, preference is given to those selected from the group consisting of acetonitrile, N-methylpyrrolidone (NMP), 1,3-dioxolane, dimethyl ether (DME), DME derivatives, in particular those having one or more inserted ethoxy groups, e.g. triethylene glycol dimethyl ether (TEG-DME), $C_6$-$C_{12}$-alkanes and mixtures thereof, preferably acetonitrile.

These solvents which can optionally be employed in a mass ratio of solvent:IL of from 1:1 to 50:1, in particular from 5:1 to 15:1.

To decompose the carbon compounds into carbon, these are heated to a temperature of up to 850° C., preferably from 550° C. to 750° C., under protective gas, preferably helium, neon, argon or nitrogen, particularly preferably argon, for from 2 to 5 hours, preferably 3 hours.

The heating to the decomposition temperature can influence the coating formation and accordingly represents a possible way of controlling the formation of the carbon shell.

For practical reasons, a temperature rise of from about 2 to 4° C./minute, in particular 3° C./minute, is often selected.

In a variant of the present invention, heating can be carried out initially at 2.5° C. per minute up to 300° C. and subsequently at 3.3° C. per minute up to the final temperature.

Preference is given to firstly heating to from 250 to 350° C. and then maintaining this temperature for from 0.5 to 3 hours and then heating to up to 850° C., preferably from 550 to 750° C., and maintaining this temperature for from 2 to 5 hours, preferably 3 hours.

The heating and holding at the temperature can be carried out in conventional furnaces, preferably in tube furnaces.

The lithium sulfide particles which have been produced in this way and are enveloped in a carbon layer can then be processed further to form electrodes. A process of this type is likewise provided by the present invention and comprises the steps i) to iv) or consists of these:
i) provision of an active material produced according to the above-described process of the invention,
ii) addition of at least one electronically conductive additive, optionally with addition of at least one suitable binder,
iia) optionally addition of further additives,
iii) mixing of the materials,
iv) processing of the resulting mixture, preferably by drawing and/or casting,
v) drying of the material obtained,
where a solvent, particularly preferably NMP, is preferably used in steps i) to iv).

The drawing of the electrode in step iv) is a mechanical operation in which a thin layer of the slurry is applied to a power outlet lead. This can be carried out by means of a doctor blade/film drawing frame which is drawn over the foil (e.g. in laboratory operation) or the slurry is applied to the moving foil (e.g. on an industrial scale).

The casting in step iv) is a mechanical operation which can also be referred to as slit casting. Here, a defined feed stream is homogenized by means of cavities and a slit and gently applied in a laminar fashion through a gap to the power outlet lead.

Further details of the two processes will be known to those skilled in the art.

Examples of electronically conductive additives are carbon-containing materials.

Carbon-containing materials which can preferably be used are selected from the group consisting of carbon black, synthetic or natural graphite, graphene, carbon nanoparticles, fullerenes and mixtures thereof.

One carbon black which can be used is obtainable, for example, under the trade name Ketjenblack($^R$).

A carbon black which can preferably be used is obtainable, for example, under the trade name Super P($^R$) C65.

The carbon-containing materials can have an average particle size in the range from 1 nm to 500 µm, preferably from 5 nm to 1 µm, particularly preferably from 10 nm to 60 nm, Suitable binders are polyacrylonitrile (PAN), polymethyl methacrylate (PMMA), polyethylene oxide (PEO), cellulose, cellulose derivatives, poly(vinylidene difluoride-hexafluoropropylene) copolymer (PVdF-HFP), polytetrafluoroethylene (PTFE), styrene-butadiene rubber (SBR) and polyvinylidene fluoride (PVdF). For the purposes of the present invention, preference is given to using polyvinylidene fluoride (PVdF), PAN and/or PEO, particularly preferably PAN, as binder.

The binders are preferably dissolved in a solvent, preferably the same solvent as used in steps i) to iv), in particular in NMP, before use in the process.

Further additives can be, for example, coated lithium powders. These can serve as lithium reservoir in order to compensate for an initially irreversible loss of lithium from the actual active material.

However, the addition of further additives can normally be dispensed with.

The active materials can be mixed with the at least one electronically conductive additive and the at least one suitable binder in conventional ratios. In one variant of the present invention, the weight ratio of active material:additive:binder is 4:4:2. In a further variant, the ratio is 4:5:1. In a further variant, the proportion of the active material can be significantly increased.

The cathode material produced in this way can then be processed in a conventional manner to form an electrode.

For example, it can be applied to aluminum, nickel or Al/Ni foil serving as power outlet lead.

Further power outlet leads known to those skilled in the art can equally well be used.

For the purposes of the present invention, electrolytes used can be all electrolytes which are known to those skilled in the art, including organic electrolytes comprising lithium-containing electrolyte salts known to those skilled in the art and also ionic liquids comprising electrolyte salts, for example lithium bis(fluorosulfonyl)imide (LiFSI) or lithium bis(trifluoromethanesulfonyl)imide (LiTFSI) in 1-butyl-1-methylpyrrolidinium bis(trifluoromethanesulfonyl)imide ($PYR_{14}TFSI$), polymer electrolytes comprising electrolyte salts, for example polyethylene oxide (PEO) comprising LiTFSI (and optionally $PYR_{14}TFSI$), and optionally liquid organic electrolytes such as $LiCF_3SO_3$ in TEGDME, $LiPF_6$ in any mixtures of ethylene carbonate (EC)/dimethyl carbonate (DMC)/diethyl carbonate (DEC)/propylene carbonate (PC) and also LiTFSI or LiPF$_6$ or LiBF$_4$ in a mixture of dimethoxyethane (DME) and 1,3-dioxolane (DOL) or ionic liquids, solid-state electrolytes and any combinations.

Preference is given to using electrolytes selected from the group consisting of lithium bis(fluorosulfonyl)imide or lithium bis(trifluoromethanesulfonyl)imide in 1-butyl-1-methylpyrolidinium bis(trifluoromethanesulfonyl)imide, polyethylene oxide comprising LiTFSI, polyethylene oxide comprising LiTFSI and PYR$_{14}$TFSI, LiCF$_3$SO$_3$ in TEGDME, LiPF$_6$ in any mixtures of ethylene carbonate/dimethyl carbonate/diethyl carbonate/propylene carbonate, LiTFSI in dimethoxyethane/1,3-dioxolane, LiPF$_6$ in dimethoxyethane/1,3-dioxolane, LiBF$_4$ in dimethoxyethane/1,3-dioxolane, LiCF$_3$SO$_3$, in 3:7 tetraethylene glycol dimethyl ether (TEGDME)/1,3-dioxolane and mixtures thereof.

An example of an electrolyte is LiCF$_3$SO$_3$ in 3:7 tetraethylene glycol dimethyl ether (TEGDME)/1,3-dioxolane.

Particular preference is given to using Pyr$_{14}$TFSI with LiTFSI (9:1).

For the purposes of the present invention, separators which can be used are those selected from the group consisting of polyethylene- and/or polypropylene-based separators, glass fiber-based separators, ceramic separators, cellulose-based separators and mixtures or combinations thereof.

In the case of polymer electrolytes and solid-state electrolytes, these can simultaneously also serve as separator.

Preference is given to using a single-layer polypropylene separator as is marketed, for example, as Celgard(R) 2500 or, particularly when using IL-based electrolytes, ceramic or glass fiber-based separators. p Particular preference is given to using separators which are coated on one side, in particular PET separators which are coated on one side with PEO, as are described in DE 10 2013 105 678.8. In one variant, particular preference is given to using ceramic-coated PET separators. Particularly good results have been achieved using these separators.

In the production according to the invention of the active materials, the presence of water is preferably ruled out as far as possible, preferably by working in a dry space and/or under protective gas, since Li$_2$O and H$_2$S could otherwise be formed.

The present invention further provides for the use of the active material produced according to the invention as cathode material in lithium metal batteries and/or lithium ion batteries.

For the purposes of the present invention, a type of "micro reactor" which takes account of the following requirements:
  Prevention of diffusion of soluble polysulfides to the cathode surface or to the anode side and deposition there (passivation and "shuttle mechanism")
  Prevention of particle agglomeration during charging and discharging operations
  Ensuring of electronic contact with the power outlet lead
was produced for the electrochemically active particles.

At the same time, it was ensured, for the purposes of the present invention, that the "shell" of this micro reactor is permeable to lithium ions in order to ensure transport of the lithium ions to the active material.

In addition, the known volume changes due to lithiation and delithiation were taken into account.

Carbon was used for the "reactor shell" since this has a high electronic conductivity and keeps the long-chain soluble polysulfides in the interior of the "reactor" but at the same time is permeable to the lithium ions.

In the context of the present invention, it was found that it is possible to obtain very homogeneous envelopment of lithium sulfide by for the first time using liquid precursor substances in the form of the IL instead of solid precursor substances.

The coatings according to the invention are able to withstand the volumetric changes during battery cycling without suffering damage.

In addition, a comparatively thin coating of the lithium sulfide, which is nevertheless able to satisfy the applicable requirements, is achieved according to the invention.

The use of nitrogen-containing ILs makes it possible, according to the invention, to achieve "doping" of the coating, which considerably improves the electrical properties; in particular, the conductivity can be significantly increased. The proportion of nitrogen can be influenced by means of the final temperature.

The results achieved when using the active material produced according to the invention are superior to those obtained when using comparable active materials.

A high efficiency can be achieved when using the cells according to the invention; the shuttle effect can also be suppressed without addition of additives.

It was able to be shown in cycling tests that stable cycling is possible when working according to the present invention.

The present invention made it possible to obtain active materials whose coating is more uniform and more homogeneous than in the case of materials of the prior art.

In addition, it is found that the capacity of the cells according to the invention decreases significantly more slowly than in the case of those according to the prior art.

In the case of the batteries according to the invention, not only are smaller amounts of electrolyte required, which significantly influences the costs for a battery, but use of only small amounts also surprisingly improves the performance of such a battery in terms of an increased specific capacity, a higher efficiency and an improved cycling stability.

The process of the invention is overall an inexpensive process.

The process of the invention can easily be implemented on an industrial scale.

The present invention also encompasses batteries which have been produced using the active materials of the invention or the active materials produced by means of the process of the invention, and also the corresponding use of the active materials of the invention or the active materials produced by means of the process of the invention.

The layer of carbon obtained on the surface of the electrochemically active particles by means of the specific procedure of the present invention is a homogeneous, uniform and closed coating which, in contrast to the prior art, leads to improved properties.

The various embodiments of the present invention, for example but not exclusively those of the various dependent claims, can be combined with one another in any way.

The invention will now be illustrated with reference to the following nonlimiting examples.

EXAMPLES

Example 1

Production of Various Active Materials According to the Invention

An active material was produced by firstly taking 1-2 gram of $Li_2S$ and comminuting it in the presence of acetonitrile in a ball mill in order to break up the secondary particles and then drying it at 120° C. for 24 hours.

The $Li_2S$ was subsequently wetted with liquids shown in Table 1 by grinding the mixture of IL or IL/acetonitrile with $Li_2S$ in the various ratios indicated in a mortar for 30 minutes in each case.

In the next step, the carbonization under a protective gas atmosphere (argon) was carried out by firstly heating to 300° C. and maintaining this temperature for 1 hour. The material was then heated at 2.5° C. per minute to 300° C. and then at 3.3° C. per minute up to 700° C. and the temperature was maintained for 3 hours. After cooling to room temperature, the material was ground in a mortar to break up the agglomerates.

Figure 3:
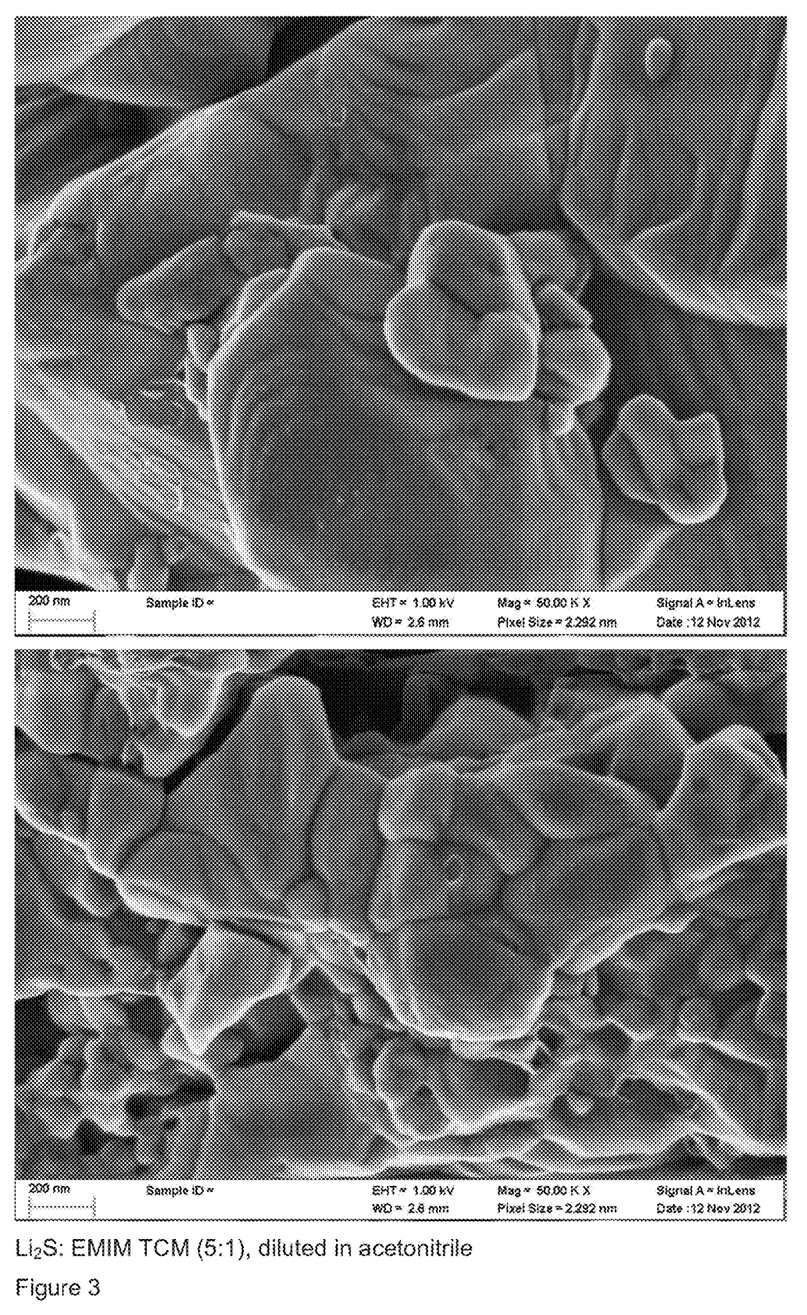
FIG. 3 shows scanning electron micrographs of an active material according to the invention, in the case of which $Li_2S$ was coated with EMIM TCM in a ratio of 5:1.
Figure 4:
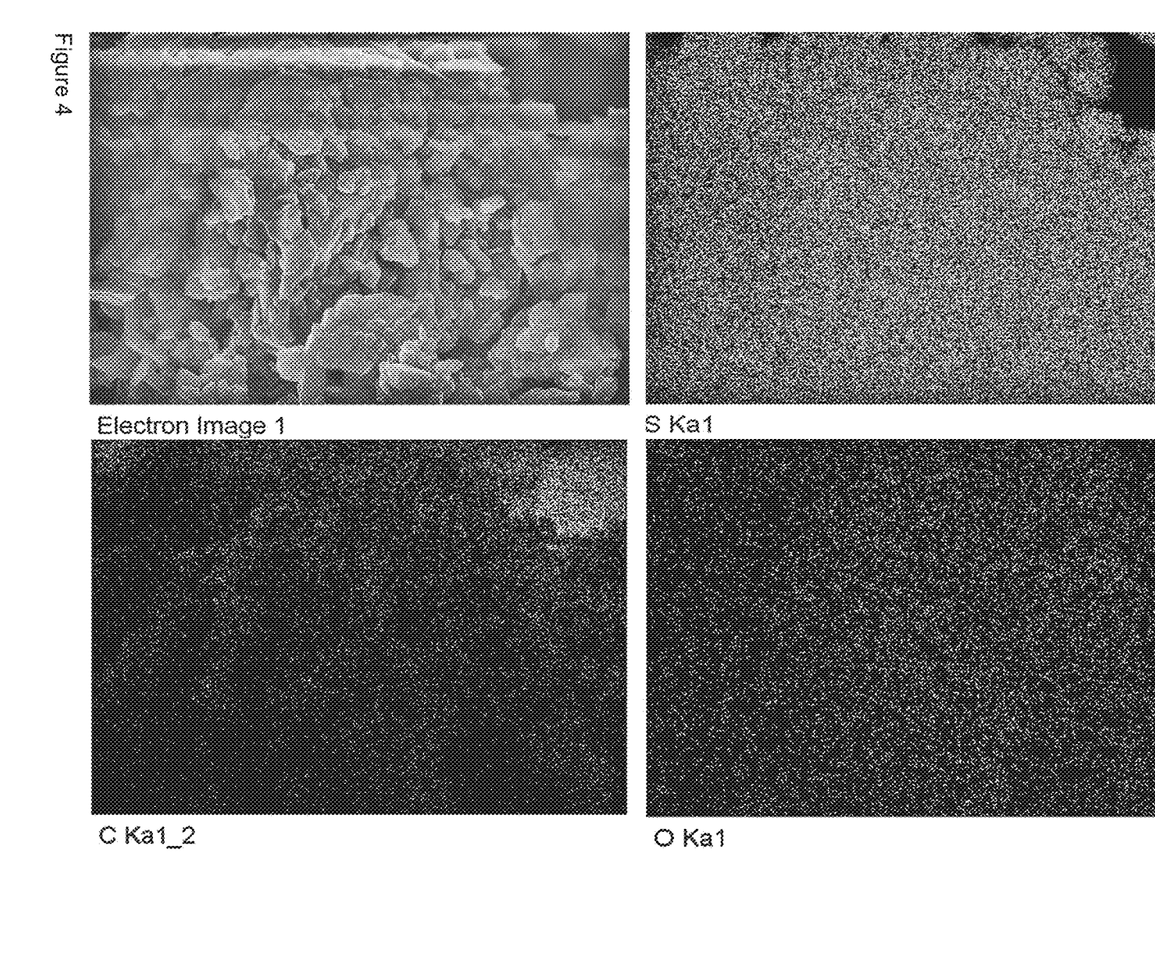
FIG. 4 shows EDX mapping of the active material according to the invention shown in FIG. 3. At top left, a scanning electron micrograph of the particle; at top right sulfur; at bottom left carbon and at bottom right oxygen.

The resulting material was black, which is evidence that the lithium sulfide is completely enclosed. This is confirmed by the scanning electron micrographs (FIG. 3).

TABLE 1

| IL | Production | Pre-treatment | $Li_2S$:IL ratio | Carbonization | Appearance | C | H | N |
|---|---|---|---|---|---|---|---|---|
| — | $Li_2S$ | Pre-drying at 120° C. for 24 h | Pure | 300 C. 1 h 700 C. 3 h | Powder; white | 0.3 | 0 | 0 |
| $Pyr_{14}$ TCM | simple mix | Pre-drying at 120° C. for 24 h | 1:1 $Pyr_{14}$ TCM | 300 C. 1 h 700 C. 3 h | Powder; dark; agglomerates | 16.25 | 0.06 | 9.88 |
| EMIM TCM | simple mix | Pre-drying at 120° C. for 24 h | 3:2 EMIM TCM | 300 C. 1 h 700 C. 3 h | Powder; dark; agglomerates | 12.28 | 0.06 | 7.98 |
| EMIM TCM | EMIM TCM + ACN (1:9) | Pre-drying at 120° C. for 24 h | 10:1 EMIM TCM | 300 C. 1 h 700 C. 3 h | Dark grey, some-times still white | 1.41 | 0.04 | 0.77 |
| EMIM TCM | EMIM TCM + ACN (1:9) | Pre-drying at 120° C. for 24 h | 5:1 EMIM TCM | 300 C. 1 h 700 C. 3 h | Powder; dark; no agglomerates | 3.66 | 0.05 | 2.01 |
| BMIM DCA | BMIM DCA + ACN (1:9) | Pre-drying at 120° C. for 24 h | 5:1 BMIM DCA | 300 C. 1 h 700 C. 3 h | Powder; light-grey; some-what white | / | / | / |
| BMIM DCA | BMIM DCA + ACN (1:9) | Pre-drying at 120° C. for 24 h | 2:1 BMIM DCA | 300 C. 1 h 700 C. 3 h | Powder; grey, sometimes still white | / | / | / |

The best coating was obtained when $Li_2S$ was coated in a mass ratio of 5:1 with EMIM TCM, with the ionic liquid having been diluted beforehand in a mass ratio of 9:1 with acetonitrile.

It was able to be established by means of EDX mapping that the active materials according to the invention display a uniform distribution of sulfur and carbon. The active materials according to the invention thus have a uniform coating.

The elemental analysis of EMIM TCN (5:1) indicated a proportion of C and N of about 5-6%. This is in agreement with TGA tests in example 1b) which indicated that EMIM TCN loses about one third of its weight up to 700° C.

Examples 1a-1c

Production of the Active Materials

The general procedure of example 1 was repeated using the following ILs:

BMIM DCA from table line 6 (example 1a-ratio of $Li_2S:IL=5:1$),
EMIM TCM from table line 5 (example 1b -ratio of $Li_2S:IL=5:1$),
$Pyr_{14}$TCM from table line 2 (example 1c-ratio of $Li_2S:IL=1:1$).

Figure 1:
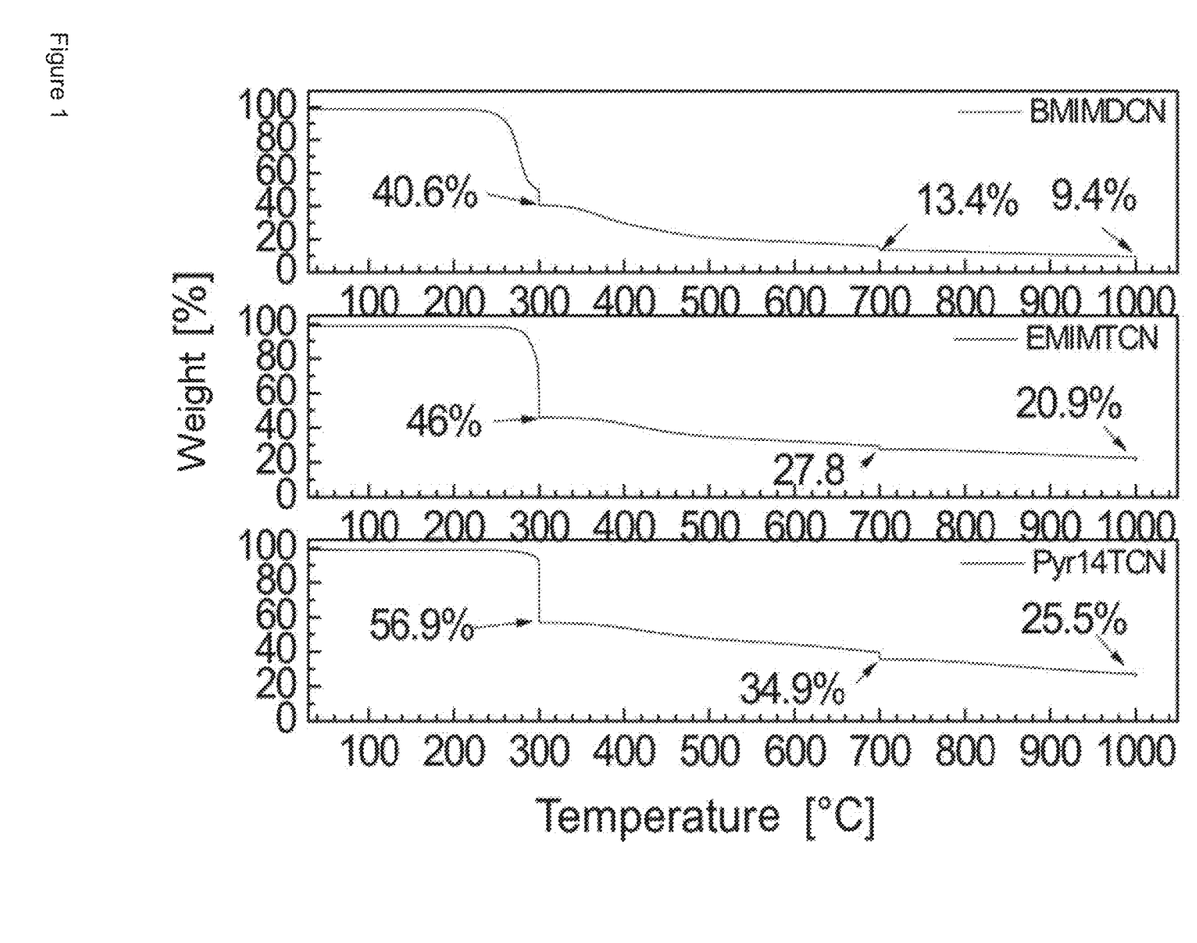
FIG. 1 shows TGA measurements on three ILs to be used according to the invention.

Direct comparison of examples 1a to 1c showed that EMIM TCM and $Pyr_{14}$TCM lead to a higher yield of carbon compared to BMIM DCA. Compared to BMIM DCA, EMIM TCM and $Pyr_{14}$TCM lose about ⅔ of their mass up to 700° C., BMIM DCA significantly more. Thermogravimetric measurements (TGA) were carried out for this purpose. Here, the respective sample was heated under inert gas and the weight loss was measured as a function of the temperature. (FIG. 1)

Figure 2:
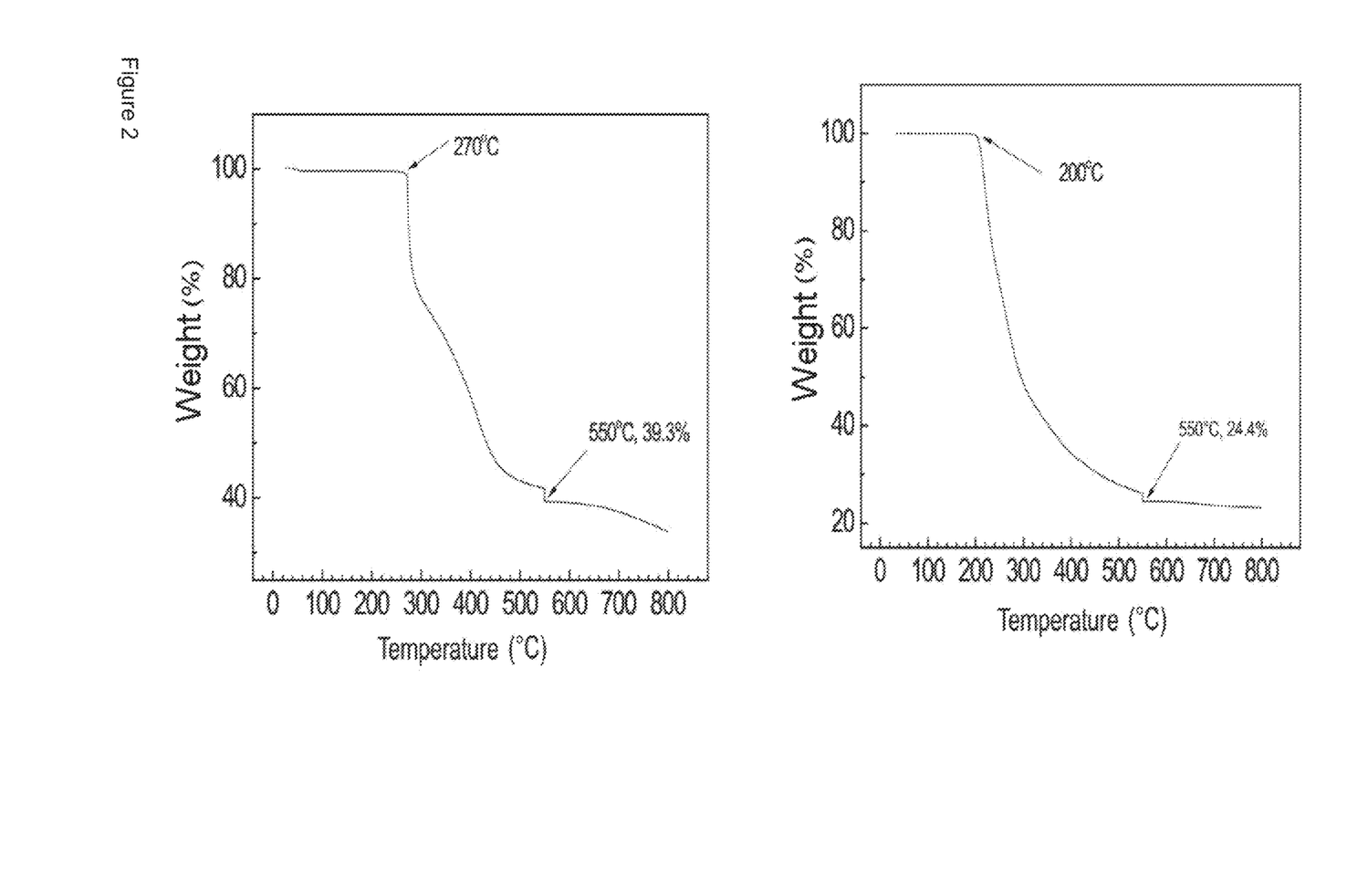
FIG. 2 shows corresponding TGA measurements on materials of the prior art (WO 2013/057023), with polyacrylonitrile being shown at left and sucrose being shown at right.

Corresponding TGA tests were carried out on the active materials as described in WO 2013/057023 (FIG. 2).

Figure 6:
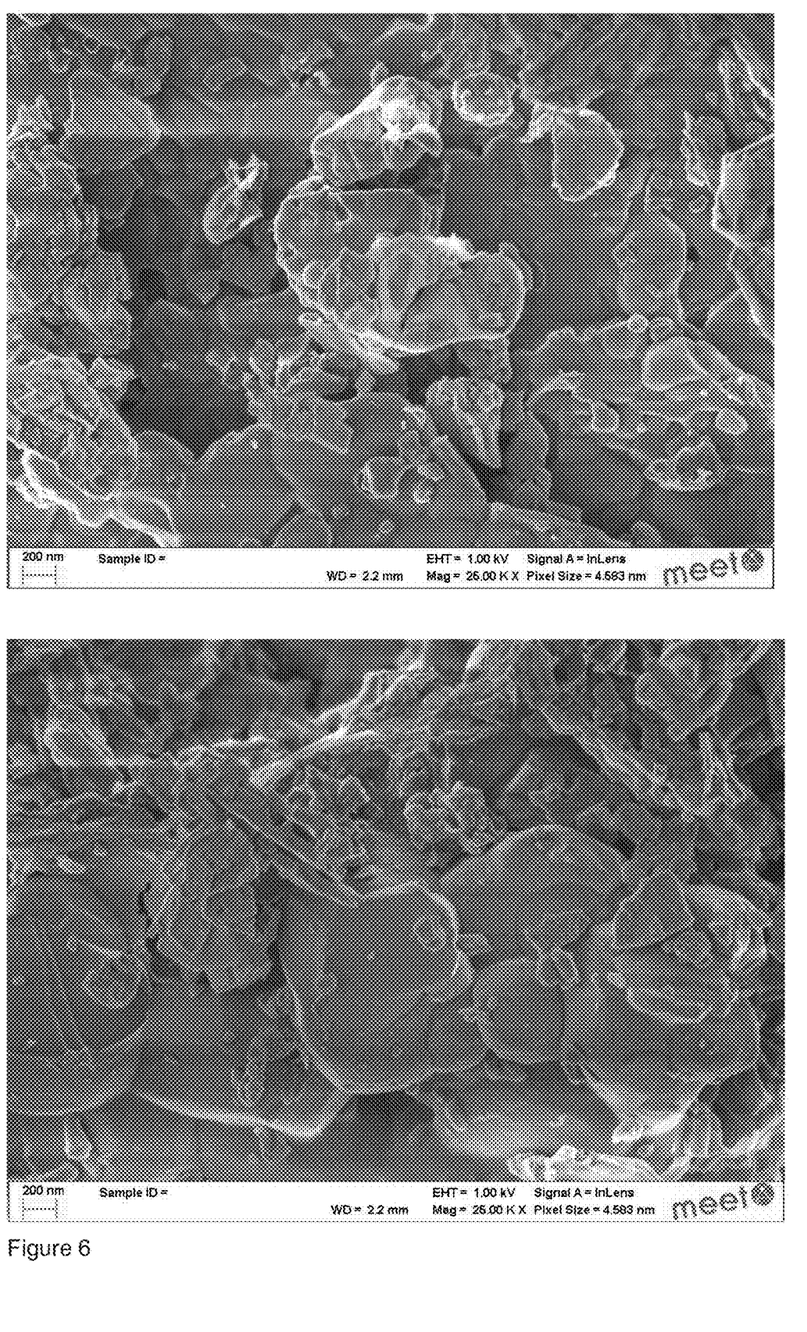
FIG. 6 shows scanning electron micrographs of $Li_2S$ coated on the basis of PAN
Figure 7:
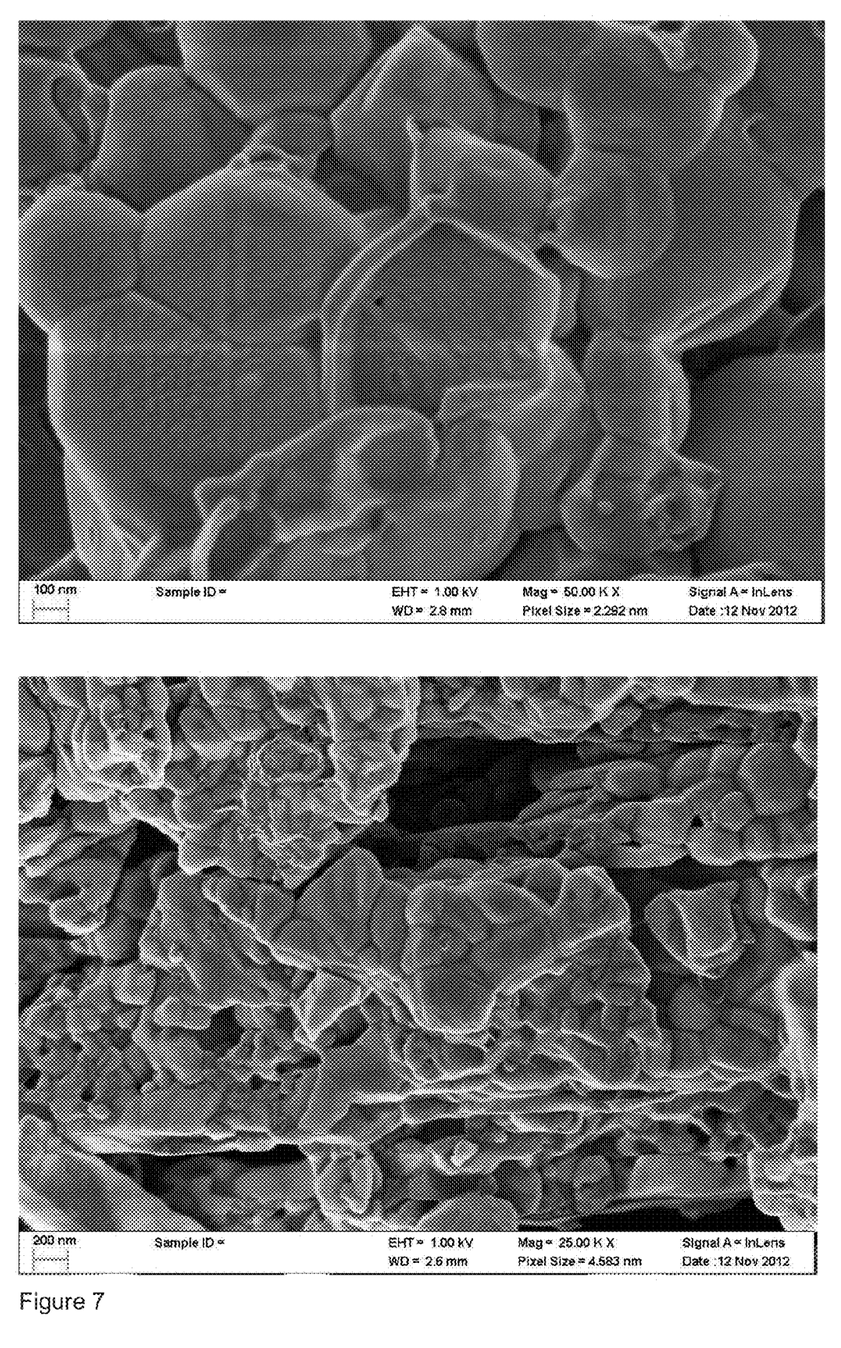
FIG. 7 shows scanning electron micrographs of $Li_2S$ coated on the basis of EMIM TCM.

Scanning electron micrographs of coated $Li_2S$ produced on the basis of EMIM TCM (FIG. 7) or using PAN (FIG. 6) were recorded. It can be seen that more homogeneous, denser coatings on the $Li_2S$ particles were achieved using EMIM TCM.

Example 2

Production of an Electrode 40 g of the active materials produced in Example 1 were in each case mixed with 40 g of Super P(R) Li and 20 g of 105 strength PVdF solution in a mixer (ball mill) at 200-400 revolutions per minute for one hour, then left to rest for 10 minutes. This was repeated three times.

The products obtained were dried for 24 hours at room temperature in a dry space and subsequently for another 2 hours at 60° C., for 2 hours at 80° C. and for 2 hours at 100° C.

The resulting mixture was applied to an aluminum foil (layer thickness wet: 130 µm) and dried for 24 hours under slightly subatmospheric pressure at room temperature and for 48 hours in vacuo at 100° C.

Electrodes were produced using the dried cathode materials by placing the constituents in a "pouch bag". Here, Al/Ni voltage collectors were used, $Pyr_{14}$TFSI:LiTFSI (9:1) was used as electrolyte and Celgard(R) 2500 was used as separator.

Example 3a

Production of an Active Material According to the Prior Art

The procedure of Example 1 of WO 2013/057023 was employed.

Example 3b

Production of an Electrode According to the Prior Art (Comparison)

The procedure of Example 2 was repeated using the active material from example 3a as active material.

Figure 8:
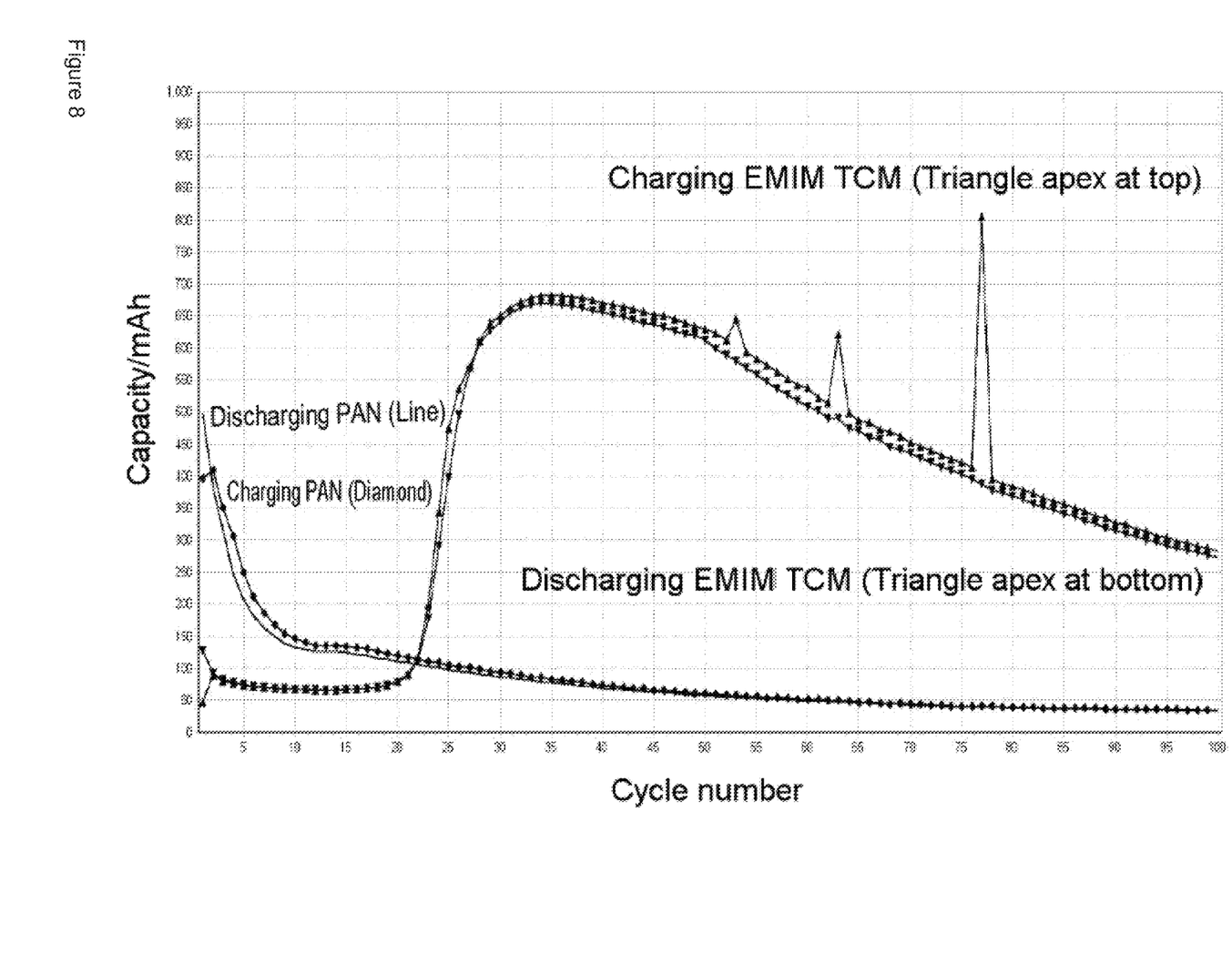
FIG. 8 shows a cycling comparison of the electrodes obtained from coatings based on PAN and EMIM TCM.
Abscissa: cycle number
Ordinate: specific capacity [mAh/g of $Li_2S$]
for cycle No. 0, upper curve (red): PAN
for cycle No. 0, lower curve (green): EMIM-TCM FIG. 9
Abscissa: capacity [mAh]
Ordinate: voltage [V]
short curves (capacity from about 0 to 60 mAh) (red): PAN
long curves (capacity from about 0 to greater than 600 mAh) (green): EMIM-TCM
Figure 9:
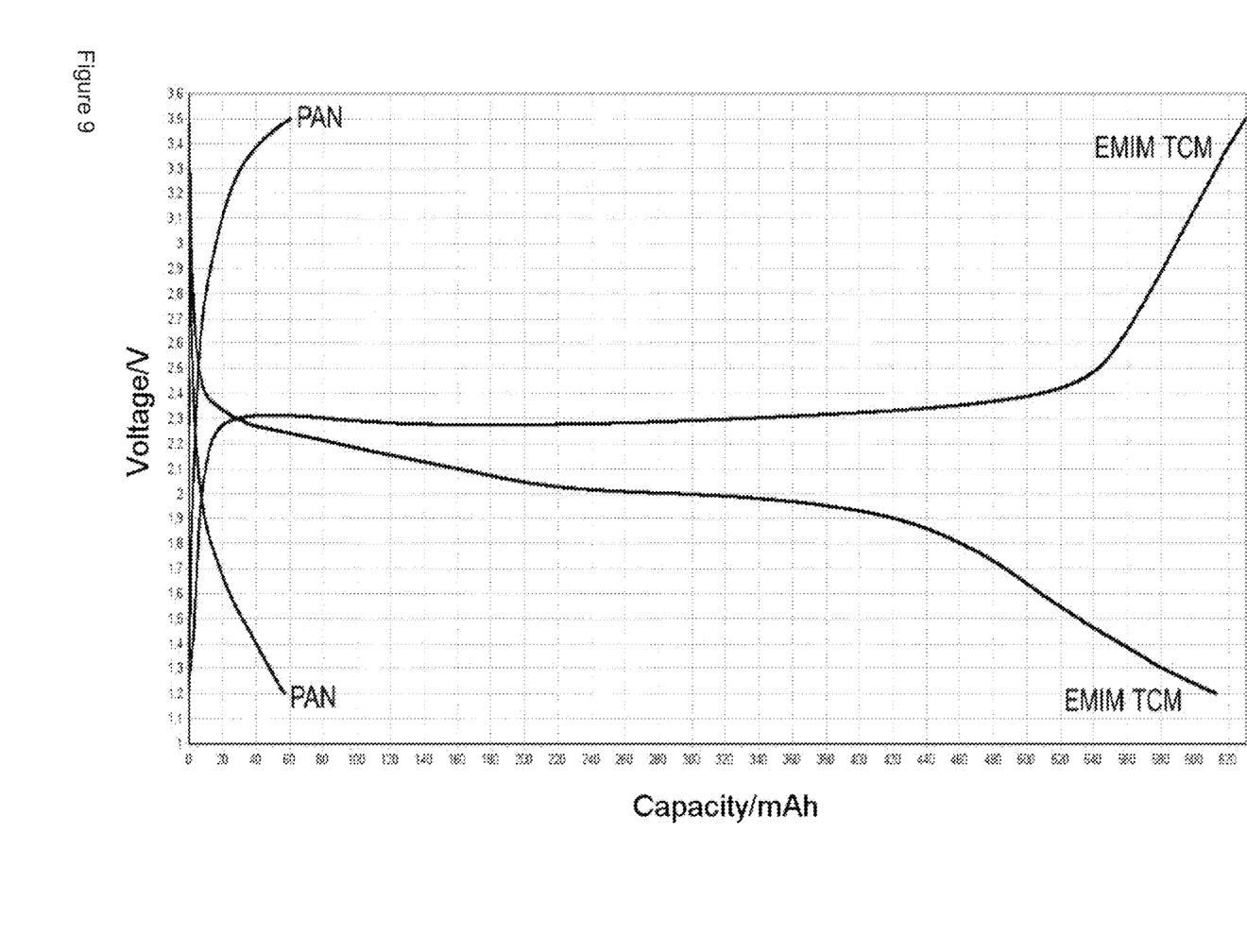

Measurements were carried out on the electrodes produced as described in Example 2 and Example 3 (comparison), and the results of these are shown in FIGS. 8 and 9.

A comparison shows that the capacity of the cells according to the invention decreases significantly more slowly.

Example 4

Cyclic Test Using Active Material According to the Invention

A procedure analogous to Example 2 was employed.
$Li_2S$/C EMIM-TCM:SuperP:PVdF (40:20:20) was used as electrode (PVdF=polyvinylidene fluoride).

The separator was a polyethylene oxide-coated Separion separator, and
$Pyr_{14}$TFSI LiTFSI (9:1) was used as electrolyte.

Figure 5:
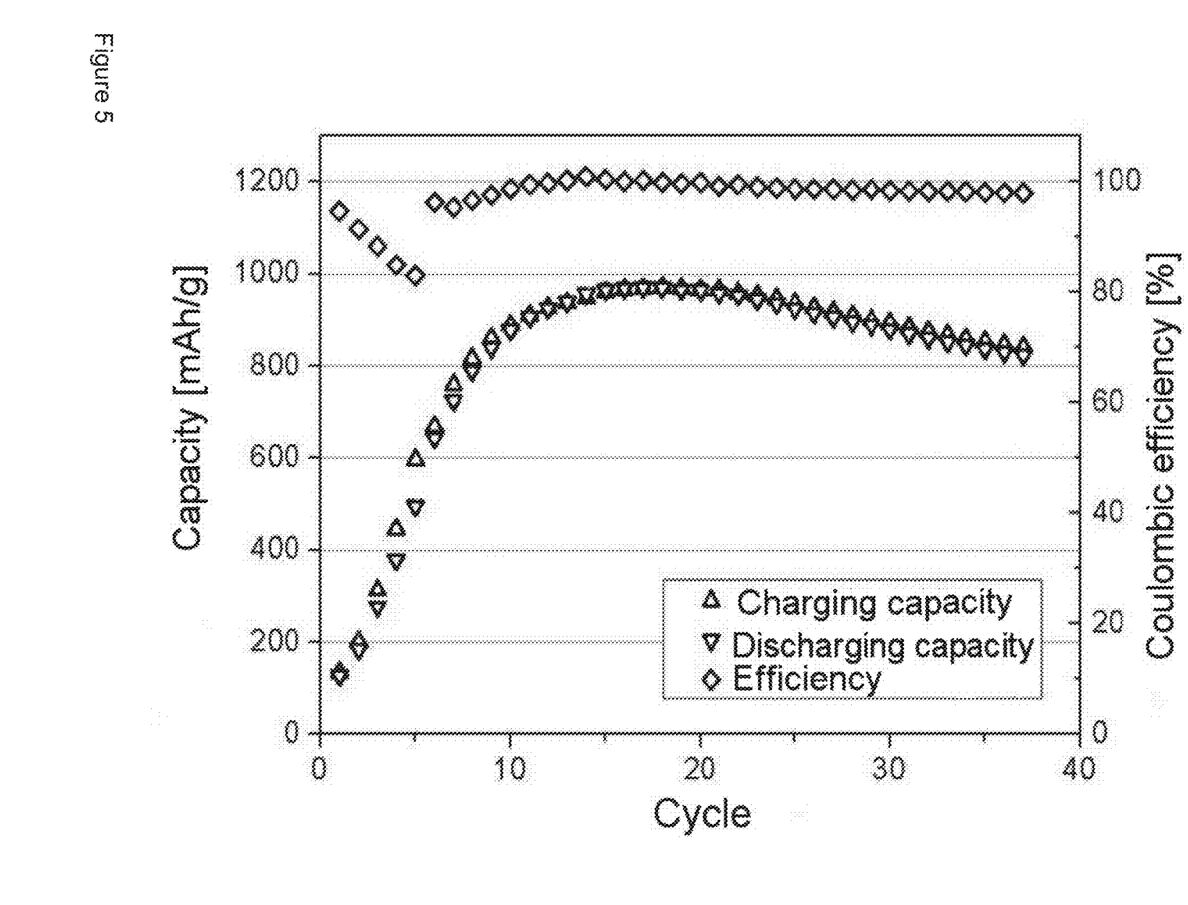
FIG. 5 shows a cycling test using an active material according to the invention.

The test cell was a pouch bag at 40° C.
The result is shown in FIG. 5.
It can be seen from this that a high efficiency was achieved; the shuttle effect was suppressed without addition of an additive.

What is claimed is:

1. A process for producing an active material for a battery, wherein the process comprises:
    (a) providing lithium sulfide particles,
    (b) optionally drying and/or comminution of the lithium sulfide particles,
    (c) adding at least one ionic liquid, optionally in an organic solvent, to the lithium sulfide particles and mixing to obtain a mixture,
    (d) heating the mixture of (c), optionally under protective gas, to a temperature above a decomposition limit of the at least one ionic liquid and below a decomposition temperature of the lithium sulfide particles, as a result of which the at least one ionic liquid decomposes to carbon, which deposits as a homogeneous layer on a surface of the lithium sulfide particles,
    (e) optionally comminution of the product of (d) to break up agglomerates.

2. The process of claim 1, wherein the lithium sulfide is $Li_2S$.

3. The process of claim 1, wherein in (b) drying is carried out at temperatures of from 50 to 150° C. for from 5 hours to 2 days and/or comminution of the lithium sulfide particles is carried out by milling.

4. The process of claim 1, wherein the at least one ionic liquid comprises a nitrogen-containing cation and dicyanamide and/or tricyanomethanide as anion.

5. The process of claim 4, wherein the cation is selected from one or more of pyridinium, pyridinium derivatives, pyrrolidinium, pyrrolidinium derivatives, imidazolium, and imidazolium derivatives.

6. The process of claim 4, wherein the cation is selected from 1-butyl-3-methylimidazolium, 1-ethyl-3-methylimidazolium and 1-butyl-1-methylpyrrolidinium.

7. The process of claim 5, wherein the anion is selected from tricyanomethanide.

8. The process of claim 1, wherein the at least one ionic liquid is selected from one or more of 1-butyl-3-methylimidazolium dicyanamide, 1-ethyl-3-methylimidazolium tricyanomethanide, and 1-butyl-1-methylpyrrolidinium tricyanomethanide.

9. The process of claim 1, wherein acetonitrile and/or N-methylpyrrolidone is used as the organic solvent in (c).

10. The process of claim 1, wherein in (d) heating is carried out to a temperature of up to 850° C., and this temperature is maintained for from 2 to 5 hours.

11. The process of claim 1, wherein in (d) heating is firstly carried out to a temperature of from 250 to 350° C. and this temperature is then maintained for from 0.5 to 3 hours and heating is then carried out to a temperature of up to 850° C. and this temperature is maintained for from 2 to 5 hours.

12. The process of claim 1, wherein the at least one ionic liquid comprises a nitrogen-containing cation and tricyanomethanide as anion.

13. The process of claim 1, wherein acetonitrile is used as the organic solvent in (c).

14. A process for producing a cathode material, wherein the process comprises:
   (i) providing an active material produced by the process of claim 1,
   (ii) adding at least one electronically conductive additive to the active material,
   (iia) optionally adding one or more further additives,
   (iii) mixing the the active material, the at least one electronically conductive additive and the optionally added one or more further additives to provide a mixture,
   (iv) processing the mixture obtained in (iii),
   (v) drying the processed mixture obtained in (iv).

15. The process of claim 14, wherein a solvent is used in (i) to (iv).

16. The process of claim 15, wherein the solvent is N-methyl-pyrrolidone.

17. The process of claim 14, wherein the process consists of (i), (ii) and (iii) to (v).

18. The process of claim 14, wherein the process consists of (i), (ii), (iia) and (iii) to (v).

19. The process of claim 14, wherein processing the mixture in (iv) comprises drawing and/or casting.

20. The process of claim 14, wherein in (ii) the at least one electronically conductive material is added in combination with a binder.

* * * * *